United States Patent
Zhang et al.

(10) Patent No.: US 7,749,632 B2
(45) Date of Patent: Jul. 6, 2010

(54) FLOW SHIFTING COOLANT DURING FREEZE START-UP TO PROMOTE STACK DURABILITY AND FAST START-UP

(75) Inventors: Yan Zhang, Victor, NY (US); John C. Fagley, Victor, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 695 days.

(21) Appl. No.: 11/460,367

(22) Filed: Jul. 27, 2006

(65) Prior Publication Data
US 2008/0026274 A1   Jan. 31, 2008

(51) Int. Cl.
H01M 2/00 (2006.01)
H01M 8/00 (2006.01)

(52) U.S. Cl. .................... 429/34; 29/592.1; 429/12

(58) Field of Classification Search .............. 429/13, 429/38; 165/97–98, 100, 200–201, 253–254; 29/592.1
See application file for complete search history.

(56) References Cited

U.S. PATENT DOCUMENTS

| | | | |
|---|---|---|---|
| 3,985,578 A | 10/1976 | Witherspoon et al. | |
| 4,582,765 A * | 4/1986 | Kothmann ................. | 429/13 |
| 5,272,017 A | 12/1993 | Swathirajan et al. | |
| 5,624,769 A | 4/1997 | Li et al. | |
| 5,776,624 A | 7/1998 | Neutzler | |
| 6,103,409 A | 8/2000 | DiPierno Bosco et al. | |
| 6,277,513 B1 | 8/2001 | Swathirajan et al. | |
| 6,350,539 B1 | 2/2002 | Wood, III et al. | |
| 6,372,376 B1 | 4/2002 | Fronk et al. | |
| 6,376,111 B1 | 4/2002 | Mathias et al. | |
| 6,521,381 B1 | 2/2003 | Vyas et al. | |
| 6,524,736 B1 | 2/2003 | Sompalli et al. | |
| 6,528,191 B1 | 3/2003 | Senner | |
| 6,566,004 B1 | 5/2003 | Fly et al. | |
| 6,630,260 B2 | 10/2003 | Forte et al. | |

(Continued)

FOREIGN PATENT DOCUMENTS

EP   1 513 209 A2   9/2005

(Continued)

OTHER PUBLICATIONS

Machine Translation and Abstract in English of JP 2004-311324.*

*Primary Examiner*—Dah-Wei D Yuan
*Assistant Examiner*—Claire L Rademaker
(74) *Attorney, Agent, or Firm*—John A. Miller; Miller IP Group, PLC

(57) ABSTRACT

An auxiliary coolant system, for a fuel cell stack system, includes a reversible coolant pump, a control valve, and plumbing lines. The pump enables the reversal of the coolant flow direction in the fuel cell stack system. The auxiliary coolant system is in parallel with the primary coolant system, and communicates with the primary coolant system via valves. During start-up, when coolant flow is from right-to-left through the fuel cell stack system, one valve of the primary coolant system will be partly open and control the amount of cold coolant make-up from the primary coolant system to the fuel cell stack while the valve of the auxiliary coolant system will be controlling the temperature differential between the inlet and outlet of the stack.

29 Claims, 3 Drawing Sheets

F1 : Most of flow through Valve 20, small portion of flow through Valve 22
F2 : All of flow through Valve 20, no flow through Valve 22

U.S. PATENT DOCUMENTS

| | | |
|---|---|---|
| 6,663,994 B1 | 12/2003 | Fly et al. |
| 6,740,433 B2 | 5/2004 | Senner |
| 6,777,120 B2 | 8/2004 | Nelson |
| 6,793,544 B2 | 9/2004 | Brady et al. |
| 6,794,068 B2 | 9/2004 | Rapaport |
| 6,811,918 B2 | 11/2004 | Blunk |
| 6,824,909 B2 | 11/2004 | Mathias |
| 2004/0026074 A1* | 2/2004 | Ahner et al. ............ 165/202 |
| 2004/0229087 A1 | 11/2004 | Senner et al. |
| 2005/0026012 A1 | 2/2005 | O'Hara |
| 2005/0026018 A1 | 2/2005 | O'Hara et al. |
| 2005/0026523 A1 | 2/2005 | O'Hara et al. |
| 2007/0154771 A1* | 7/2007 | Jang et al. ............... 429/38 |

FOREIGN PATENT DOCUMENTS

JP    2004311324 A    * 11/2004

* cited by examiner

F1 : Most of flow through Valve 20, small portion of flow through Valve 22

F2 : All of flow through Valve 20, no flow through Valve 22

FLOW SHIFTING COOLANT DURING FREEZE START-UP TO PROMOTE STACK DURABILITY AND FAST START-UP

FIELD OF THE INVENTION

The present invention relates generally to fuel cells, and more particularly to coolant systems for fuel cell stack systems.

BACKGROUND OF THE INVENTION

Fuel cells have been used as a power source in many applications. For example, fuel cells have been proposed for use in electrical vehicular power plants to replace internal combustion engines. In PEM-type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements, sometimes referred to as the gas diffusion media (DM) components, that: (1) serve as current collectors for the anode and cathode; (2) contain appropriate openings therein for distributing the fuel cell's gaseous reactants over the surfaces of the respective anode and cathode catalysts; (3) remove product water vapor or liquid water from electrode to flow field channels; (4) are thermally conductive for heat rejection; and (5) have mechanical strength. The term fuel cell is typically used to refer to either a single cell or a plurality of cells (e.g., a stack) depending on the context. A plurality of individual cells are commonly bundled together to form a fuel cell stack and are commonly arranged in series. Each cell within the stack comprises the MEA described earlier, and each such MEA provides its increment of voltage.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

Examples of technology related to PEM and other related types of fuel cell systems can be found with reference to commonly-assigned U.S. Pat. Nos. 3,985,578 to Witherspoon et al.; 5,272,017 to Swathirajan et al.; 5,624,769 to Li et al.; 5,776,624 to Neutzler; 6,103,409 to DiPierno Bosco et al.; 6,277,513 to Swathirajan et al.; 6,350,539 to Woods, III et al.; 6,372,376 to Fronk et al.; 6,376,111 to Mathias et al.; 6,521,381 to Vyas et al.; 6,524,736 to Sompalli et al.; 6,528,191 to Senner; 6,566,004 to Fly et al.; 6,630,260 to Forte et al.; 6,663,994 to Fly et al.; 6,740,433 to Senner; 6,777,120 to Nelson et al.; 6,793,544 to Brady et al.; 6,794,068 to Rapaport et al.; 6,811,918 to Blunk et al.; 6,824,909 to Mathias et al.; U.S. Patent Application Publication Nos. 2004/0229087 to Senner et al.; 2005/0026012 to O'Hara; 2005/0026018 to O'Hara et al.; and 2005/0026523 to O'Hara et al., the entire specifications of all of which are expressly incorporated herein by reference.

During the fuel cell stack subzero start-up, at some point in time a subzero coolant stream needs to be introduced to the stack to avoid stack MEA overheating. The flowing cold coolant is heated up by the waste heat generated by the stack. In order to avoid quenching the stack, coolant is generally introduced at a relatively low flow rate, or via coolant pulsing to avoid coolant flow poor distribution. Such an operating strategy can cause a large down-the-channel temperature variation within a cell, because the cold coolant stream will quench the section of the plate near the coolant inlet, while the amount of coolant does not have enough cooling capacity to control the temperature of the plate near the coolant outlet. For example, more than 50° C. in temperature variation along the bipolar plate has been frequently observed in experiments for such start-up operations. Experimental results seem to indicate that when coolant overcools a region of the stack near the coolant inlet, the current density is driven from the cold portion to the warm portion, which further exacerbates cold zones (i.e., no longer being heated due to lack of current density) and hot zones (i.e., heated at an even greater rate due to increased current density).

Such a wide temperature distribution within a cell can result in poor distribution of RH, in that the membrane at the high temperature zone is relatively dry while the membrane at the low temperature zone is very wet, thus reducing the MEA durability. In addition, such a wide temperature distribution could have negative impact on the mechanical stress of the bipolar plate, MEA, DM and/or the like.

Attempting to heat the stack without coolant flow shifting has resulted in large temperature variations within the stack, as shown in FIG. 1. In this view, the stack, at start-up, is represented by ten elements, with an overall temperature variation of approximately 50° C., e.g., between element 1 and element 10.

An alternative to conventional approaches has been to use an in-line coolant heater, for example, a heater in the coolant manifold of the stack which might be able to reduce the down-the-channel temperature variation within a cell. However, the mechanization utilizing the in-line heater will cost more, and will consume power, thus resulting in lower fuel efficiency.

Accordingly, there exists a need for new and improved fuel cell systems, for example those having coolant flow shifting systems operable during freeze start-up conditions so as to promote stack durability and fast start-up.

SUMMARY OF THE INVENTION

In accordance with the general teachings of the present invention, an auxiliary coolant system for a fuel cell stack system is provided, that includes a reversible coolant pump, a control valve, and plumbing lines. The pump enables the reversal of the coolant flow direction in the fuel cell stack system. The auxiliary coolant system is in parallel with the primary coolant system, and communicates with the primary coolant system via valves. During subzero start-ups, when coolant flow is from right-to-left through the fuel cell stack system, one valve of the primary coolant system will be partly open and control the amount of cold coolant make-up from the primary coolant system to the fuel cell stack while the valve of the auxiliary coolant system will be used to control the temperature differential between the inlet and outlet of the stack. In the case that the reversible pump has a variable speed, the speed can also be used to control the temperature differential between the inlet and outlet of the stack. When flow is from left-to-right, the valve in the primary coolant system will be closed, while the valve in the auxiliary coolant system will be used to control the temperature differential between the inlet and outlet of the stack. During fuel cell stack normal operations (i.e. stack operating temperature of 50-80° C.); the valve in the auxiliary coolant system will be closed.

In accordance with a first embodiment of the present invention, a fuel cell system is provided, comprising: (1) a fuel cell stack system; (2) a primary coolant system in fluid communication with the fuel cell stack system, wherein the primary coolant system is operable to introduce a cold coolant into the fuel cell stack system in a first direction during start-up; and (3) an auxiliary coolant system in fluid communication with the primary coolant system, wherein the auxiliary coolant system is selectively operable to reverse the flow of coolant into the fuel cell stack system in a second direction during start-up.

The primary coolant system includes a valve member selectively operable to control the amount of cold coolant flow into the fuel cell stack system in a first direction during start-up.

The auxiliary coolant system includes a reversible coolant pump. The reversible coolant pump is operable to allow the flow of the coolant into the fuel cell stack system to be reversed in a second direction during start-up. The reversible pump can be either a constant-speed pump or a variable-speed pump. In the case that a variable-speed pump is utilized, the pump speed can also be used to control the temperature differential between the inlet and outlet of the stack.

The flow shifting cycle time of the fuel cell stack system is determined by the heat-up requirement and coolant volume of the fuel cell stack system plus the coolant volume in the auxiliary coolant system. A short flow shifting cycle (i.e. in the order of seconds) is operable to allow the fuel cell stack system to warm up such that the temperature across the stack is substantially evenly distributed. The short flow shifting cycle can be achieved through coolant volume reduction in an auxiliary coolant loop, coolant volume reduction in a fuel cell stack system header area, or coolant volume reduction in a fuel cell stack system active area.

The auxiliary coolant system includes a valve member selectively operable to control the temperature differential between an inlet and an outlet of the fuel cell stack system. The valve member is a control valve, whose valve position is feedback controlled by the temperature difference between the fuel cell stack system's inlet and outlet temperatures.

A by-pass conduit is selectively operable to permit coolant to bypass a radiator during start-up.

In accordance with a first alternative embodiment of the present invention, a fuel cell system is provided, comprising: (1) a fuel cell stack system; (2) a primary coolant system in fluid communication with the fuel cell stack system, wherein the primary coolant system is operable to introduce a cold coolant into the fuel cell stack system in a first direction during start-up, wherein the primary coolant system includes a valve member selectively operable to control the amount of cold coolant flow into the fuel cell stack system in a first direction during start-up; and (3) an auxiliary coolant system in fluid communication with the primary coolant system, wherein the auxiliary coolant system is selectively operable to reverse the flow of coolant into the fuel cell stack system in a second direction during start-up.

In accordance with a second alternative embodiment of the present invention, a fuel cell system is provided, comprising: (1) a fuel cell stack system; (2) a primary coolant system in fluid communication with the fuel cell stack system, wherein the primary coolant system is operable to introduce a cold coolant into the fuel cell stack system in a first direction during start-up, wherein the primary coolant system includes a valve member selectively operable to control the amount of cold coolant flow into the fuel cell stack system in a first direction during start-up; and (3) an auxiliary coolant system in fluid communication with the primary coolant system, wherein the auxiliary coolant system is selectively operable to reverse the flow of coolant into the fuel cell stack system in a second direction during start-up, wherein the auxiliary coolant system includes a reversible coolant pump.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of the preferred embodiment(s) is merely exemplary in nature and is in no way intended to limit the invention, its application, or uses.

In order to avoid the large temperature distribution within a cell during freeze start-up and enable fast start-up of fuel cell system, a coolant flow shifting operation system and methodology is proposed in accordance with the general teachings of the present invention.

Figure 2:
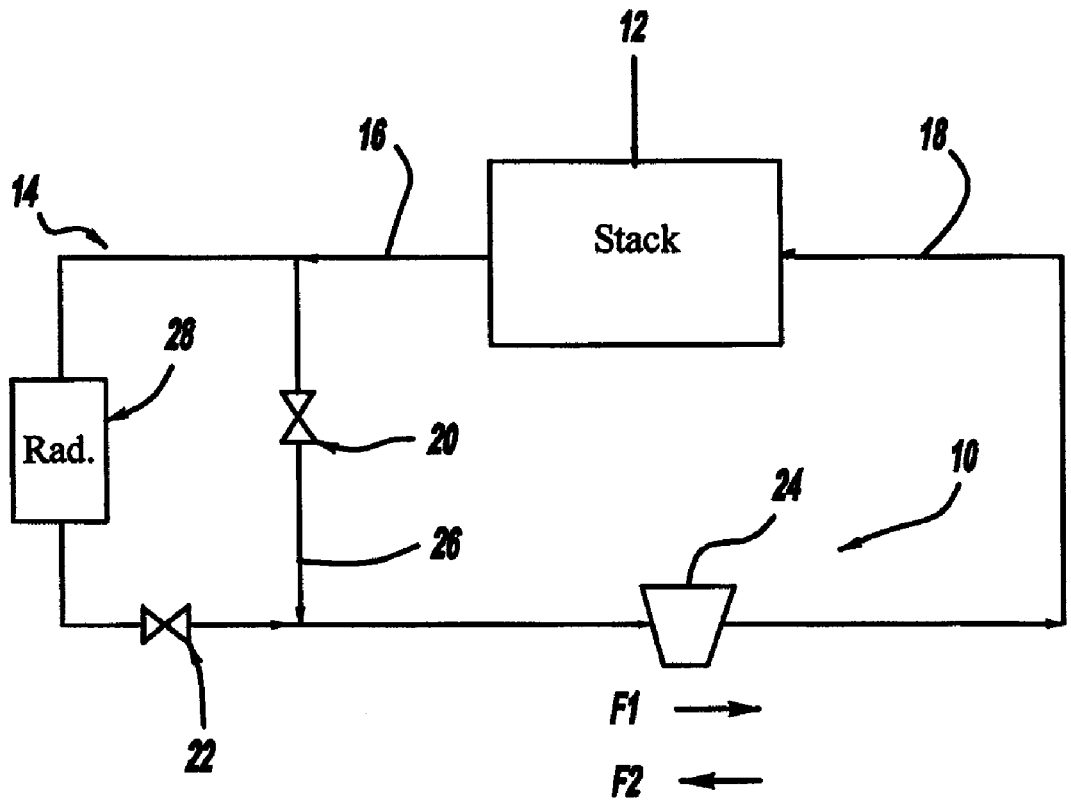
FIG. 2 is a schematic view of an auxiliary coolant system for a fuel cell stack system, in accordance with the general teachings of the present invention.

Referring to FIG. 2, there is shown a schematic view of an auxiliary coolant system 10 for a fuel cell stack system 12, in accordance with the general teachings of the present invention. A primary coolant system 14 is shown in fluid communication with both the auxiliary coolant system 10 and the fuel cell stack system 12. Various conduits, pipes and/or the like can be employed to provide fluid communication among the three systems, as is known in the art.

In this operating methodology, during start-up, subzero coolant is introduced to the fuel cell stack via a coolant outlet 16 and a coolant inlet 18 intermittently through an arrangement of a series of valves 20, 22, respectively, which can function as control valves.

In accordance with one aspect of the present invention, the auxiliary coolant system 10 is employed to provide, among other things, a coolant flow shifting capability during start-up. The auxiliary coolant system 10 primarily includes a reversible coolant pump 24, valve 20, and plumbing line 26 (e.g., by-pass line), respectively, for coolant flow shifting. A radiator 28 is shown as being in fluid communication with both the primary coolant system 14 and the auxiliary coolant system 10.

More specifically, the reversible coolant pump enables the flow direction of the coolant in the fuel cell stack system 12 to be reversed. It should be appreciated that the auxiliary coolant system 10 communicates with the primary coolant system 14 via valve 22.

By way of a non-limiting example, during start-up, when coolant flow is from right-to-left through the fuel cell stack system 12, i.e., in the direction of arrow F1, valve 20 will be used to control the temperature differential between the inlet and outlet of the stack and valve 22 will be partly open. The cold-coolant make-up from the primary coolant system 14 will be controlled by the relative opening of valve 20 and valve 22. Similarly, when flow is from left-to-right through the fuel cell stack system 12, i.e., in the direction of arrow F2, valve 20 will be used to control the temperature differential between the inlet and outlet of the stack and valve 22 will be closed. The coolant shifting cycle time should be determined by the heat-up requirement and the coolant volume of a stack plus the coolant volume of an auxiliary coolant loop at a given fuel cell system.

The shorter the coolant shifting cycle is, the faster the stack heats up and the less temperature distribution across the stack. To enable a faster coolant shifting cycle, it is preferable to minimize the coolant volume in the auxiliary coolant loop and the coolant volume in the stack headers and active area. The coolant volume in the auxiliary coolant loop can be minimized by closely coupling the auxiliary coolant loop with the stack. The stack header coolant volume can be reduced by filling the header area with low pressure drop and low thermal mass porous media, such as solid hollow spheres. It has been reported that coolant volume reduction in the stack active area can be achieved through stamped metal plate design.

Figure 3:
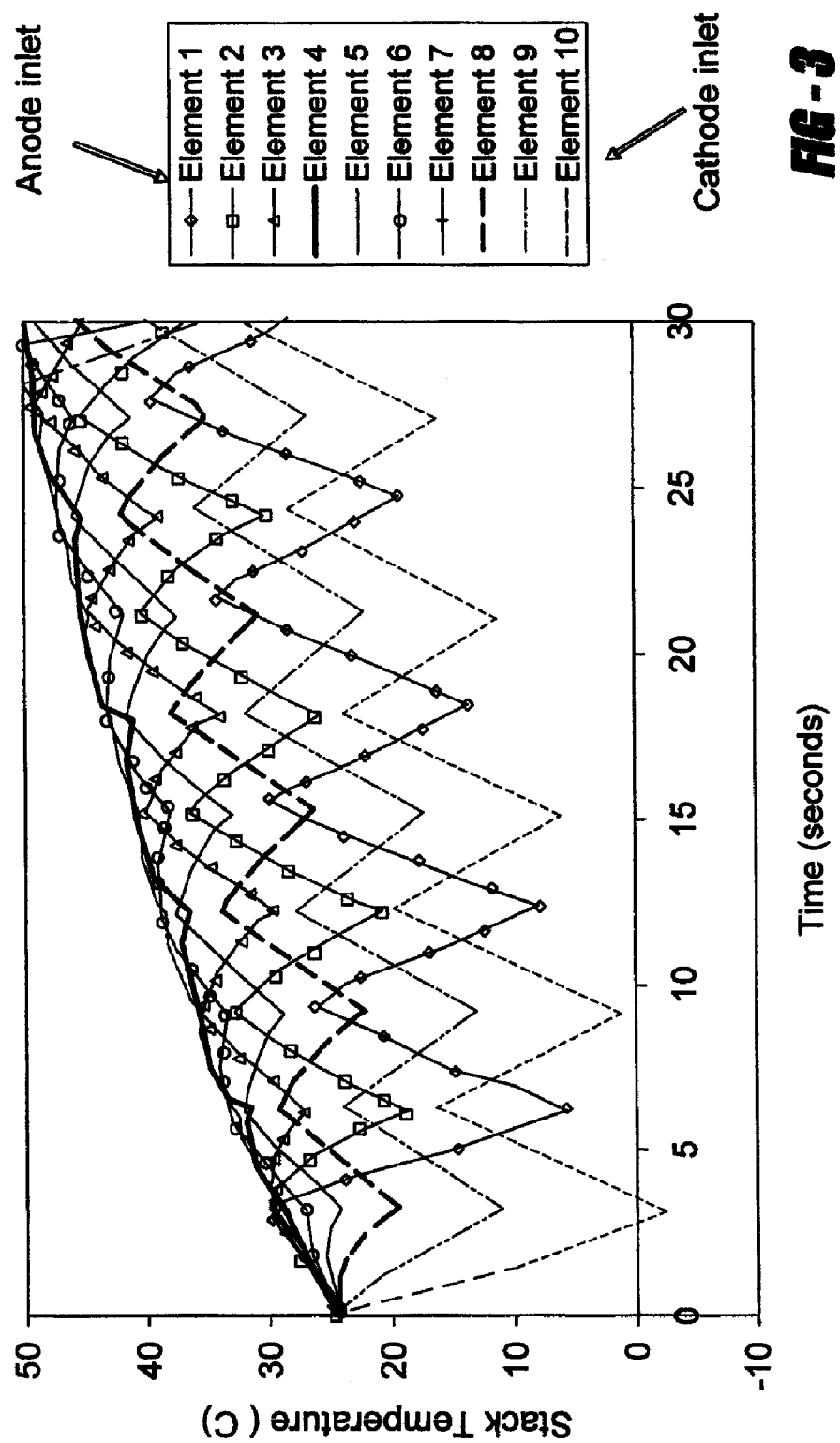
FIG. 3 is a graphical view of stack temperature as a function of time for a fuel cell stack system with an auxiliary coolant system, in accordance with the general teachings of the present invention.

Referring to FIG. 3, there is shown a graphical view of stack temperature as a function of time for a fuel cell stack system with an auxiliary coolant system, in accordance with the general teachings of the present invention.

Figure 1:
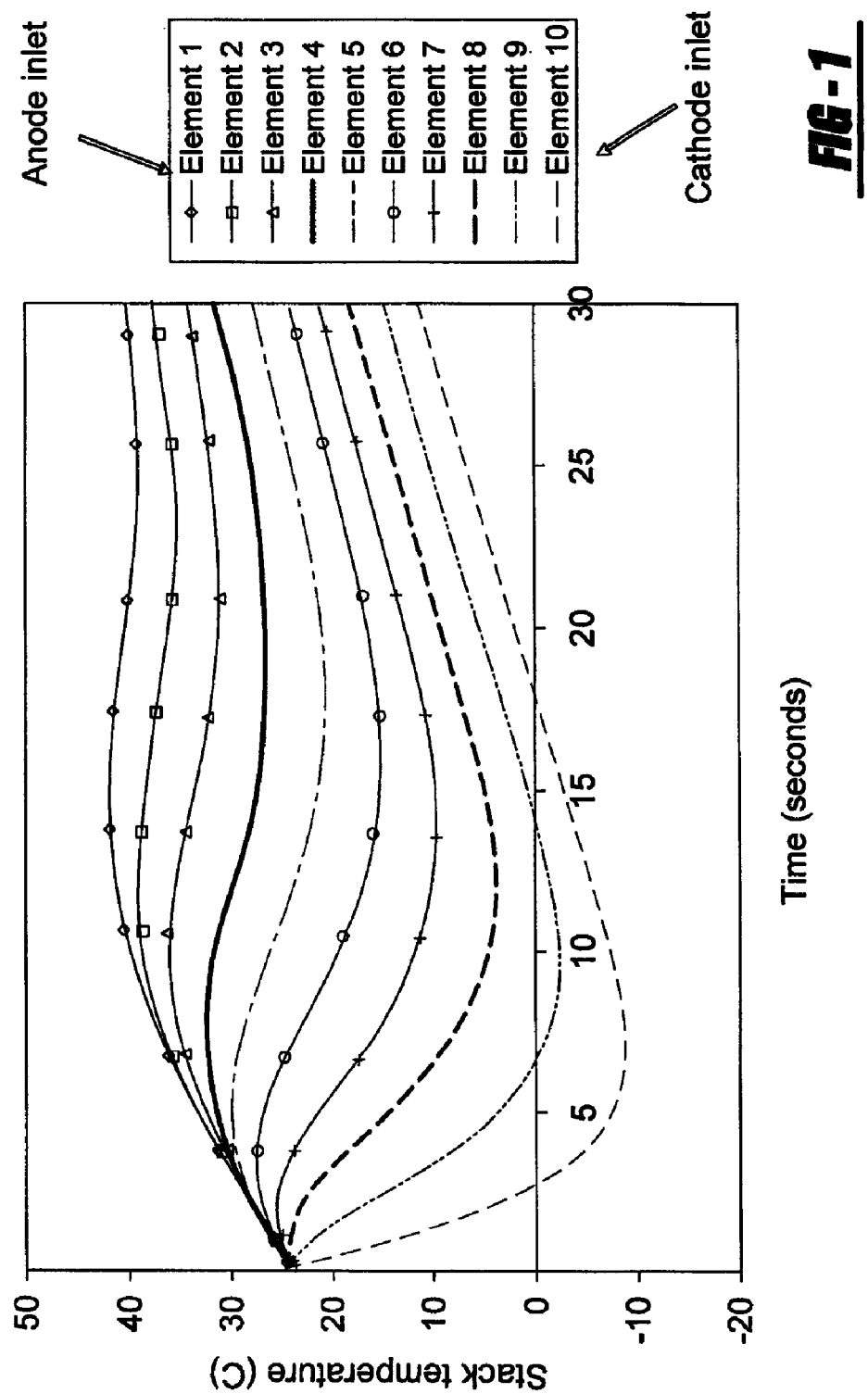
FIG. 1 is a graphical view of stack temperature as a function of time for a fuel cell stack system with a conventional coolant system, in accordance with the prior art.

In this view, the simulation results are shown for temperature profiles in a fuel cell stack system during start-up with coolant flow shifting, as previously described. As with the system shown in FIG. 1, the fuel cell stack system is represented by ten elements. As shown, the coolant flow shifting methodology of the present invention, e.g., with a six second cycle time, reduces the predicted cell maximum temperature difference from 50° C. (see FIG. 1) to 35° C., as shown in FIG. 3.

In the simulation, the coolant inlet temperature profile, as a function of time, was the same for both cases. As shown in FIG. 3, by introducing a 6 second coolant flow shift cycle, the maximum temperature spread within a cell is reduced from 50° C. (similar to levels seen in experiments) down to 35° C., assuming even current distribution. It should be noted that the temperature spread can further reduced by using an even shorter coolant flow shift cycle (e.g., less than 6 seconds). Modeling studies have been performed to demonstrate that a more even temperature distribution can be achieved within a fuel cell stack system through a coolant flow shifting methodology as described herein.

The present invention will provide numerous benefits for controlling temperature distribution through a fuel cell stack system, including but not limited to: (1) a reduction of the down-the-channel temperature distribution within a cell during freeze start-up, thus reducing the RH variation within the cell, prolonging MEA durability, and/or allowing for faster start-up; (2) a reduction of the temperature distribution within a cell during freeze start-up, thus reducing the impact of the temperature variation on the mechanical stress of the bipolar plate, DM and/or MEA; and (3) fast start-up of the entire fuel cell system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system, said system comprising:
a fuel cell stack system including a fuel cell stack;
a primary coolant system including a primary coolant loop in fluid communication with the fuel cell stack system, wherein the primary coolant system is operable to introduce a cold coolant into the fuel cell stack system in a first direction during start-up of the fuel cell system; and
an auxiliary coolant system including an auxiliary coolant loop in fluid communication with the primary coolant system, said auxiliary coolant loop being shorter than the primary coolant loop so that the auxiliary coolant loop has less volume of cooling fluid than the primary coolant loop, wherein the auxiliary coolant system is selectively operable to reverse the flow of coolant into the fuel cell stack system in a second direction during start-up of the fuel cell system so as to rapidly and uniformly heat the fuel cell stack.

2. The fuel cell system according to claim 1, wherein the primary coolant system includes a valve member selectively operable to control the amount of cold coolant flow into the fuel cell stack system in a first direction during start-up of the fuel cell system.

3. The fuel cell system according to claim 1, wherein the auxiliary coolant system includes a reversible coolant pump.

4. The fuel cell system according to claim 3, wherein the reversible coolant pump is operable to allow the flow of the coolant into the fuel cell stack system to be reversed in a second direction during start-up of the fuel cell system.

5. The fuel cell system according to claim 4, wherein the reversible coolant pump has variable speed and the reversible coolant pump can control the temperature differential between a coolant inlet and a coolant outlet of the fuel cell stack.

6. The fuel cell system according to claim 4, wherein a flow shifting cycle time of the fuel cell stack system is determined by the heat-up requirement of the fuel cell stack, wherein the flow shifting cycle time is determined based on the fuel cell stack coolant inlet and coolant outlet temperature upon start-up of the fuel cell system, and coolant volume of the fuel cell stack system plus the coolant volume in the auxiliary coolant loop, wherein the coolant volume of the fuel cell stack system plus the coolant volume in the auxiliary coolant loop is determined based on the fuel cell stack and the auxiliary coolant system design parameters.

7. The fuel cell system according to claim 6, wherein a short flow shifting cycle is operable to allow the fuel cell stack system to warm up such that the temperature across the stack is substantially evenly distributed.

8. The fuel cell system according to claim 7, wherein the short flow shifting cycle can be further achieved through coolant volume reduction in a header area of the fuel cell stack system by filing the header area with a low pressure drop media, a low thermal mass porous media, or a combination thereof, or coolant volume reduction in an active area of the fuel cell stack of the fuel cell stack system by using stamped metal plates.

9. The fuel cell system according to claim 3, wherein the auxiliary coolant system includes a valve member selectively operable to control the temperature differential between a coolant inlet and a coolant outlet of the fuel cell stack system.

10. The fuel cell system according to claim 9, wherein the valve member is a control valve, and further wherein the control valve position is feedback controlled by the temperature differential between a coolant inlet and a coolant outlet of the fuel cell stack system.

11. The fuel cell system according to claim 1, further comprising a by-pass conduit selectively operable to permit coolant to bypass a radiator during start-up of the fuel cell system.

12. A fuel cell system, said system comprising:
a fuel cell stack system including a fuel cell stack;
a primary coolant system including a primary coolant loop in fluid communication with the fuel cell stack system, wherein the primary coolant system is operable to introduce a cold coolant into the fuel cell stack system in a first direction during start-up of the fuel cell system, and further wherein the primary coolant system includes a valve member selectively operable to control the amount of cold coolant flow into the fuel cell stack system in a first direction during start-up of the fuel cell system; and
an auxiliary coolant system including an auxiliary coolant loop in fluid communication with the primary coolant system, said auxiliary coolant loop being shorter than the primary coolant loop so as to minimize the coolant volume in the auxiliary coolant loop has less volume of cooling fluid than the primary coolant loop, wherein the auxiliary coolant system is selectively operable to reverse the flow of coolant into the fuel cell stack system in a second direction during start-up of the fuel cell system so as to rapidly and uniformly heat the fuel cell stack.

13. The fuel cell system according to claim 12, wherein the auxiliary coolant system includes a reversible coolant pump.

14. The fuel cell system according to claim 13, wherein the reversible coolant pump is operable to allow the flow of the coolant into the fuel cell stack system to be reversed in a second direction during start-up of the fuel cell system.

15. The fuel cell system according to claim 14 wherein the reversible coolant pump has variable speed and the reversible coolant pump can control the temperature differential between the inlet and the outlet of the fuel cell stack.

16. The fuel cell system according to claim 14, wherein a flow shifting cycle time of the fuel cell stack system is determined by the heat-up requirement of the fuel cell stack, wherein the heat-up requirement is determined based on fuel cell stack coolant inlet and outlet temperature upon start-up of the fuel cell system, and coolant volume of the fuel cell stack system plus the coolant volume in the auxiliary coolant loop, wherein the coolant volume of the fuel cell stack system plus the coolant volume in the auxiliary coolant loop is determined based on the design parameters of the fuel cell stack and the auxiliary coolant system.

17. The fuel cell system according to claim 16, wherein a short flow shifting cycle is operable to allow the fuel cell stack system to warm up such that the temperature across the stack is substantially evenly distributed.

18. The fuel cell system according to claim 17, wherein the short flow shifting cycle can be further achieved through, coolant volume reduction in a header area of the fuel cell stack system by filling the header area with a low pressure drop media, a low mass porous media, or a combination thereof, or coolant volume reduction in an active area of the fuel cell stack of the fuel cell stack system may be achieved by using stamped metal plates.

19. The fuel cell system according to claim 13, wherein the auxiliary coolant system includes a valve member selectively operable to control the temperature differential between a coolant inlet and a coolant outlet of the fuel cell stack system.

20. The fuel cell system according to claim 19, wherein the valve member is a control valve, and further wherein the control valve position is feedback controlled by the temperature difference between the fuel cell stack system's coolant inlet and coolant outlet temperatures.

21. The fuel cell system according to claim 12, further comprising a by-pass conduit selectively operable to permit coolant to bypass a radiator during start-up of the fuel cell system.

22. A fuel cell system, said system comprising:
a fuel cell stack system including a fuel cell stack, a coolant inlet, a coolant outlet, and a temperature sensor at each of the coolant inlet and coolant outlet regions;
a primary coolant system including a primary coolant loop, a valve member and a radiator, wherein the primary coolant system is in fluid communication with the fuel cell stack system, and further wherein the valve member of the primary coolant system is selectively operable to control the amount of cold coolant flow into the fuel cell stack in a first direction during start-up of the fuel cell system;
an auxiliary coolant system including an auxiliary coolant loop, a reversible coolant pump and a valve member, wherein the auxiliary coolant system is in fluid communication with the primary coolant system, said auxiliary coolant loop being shorter than the primary coolant loop so as to minimize the coolant volume in the auxiliary coolant loop has less volume of cooling fluid than the primary coolant loop, and further wherein the reversible coolant pump is selectively operable to reverse the flow of coolant into the fuel cell stack system in a second direction during start-up of the fuel cell system so as to rapidly and uniformly heat the fuel cell stack.

23. The fuel cell system according to claim 22, wherein the reversible coolant pump is a variable speed pump capable of varying speed so as to control the temperature differential between the coolant inlet and coolant outlet of the fuel cell stack.

24. The fuel cell system according to claim 22, wherein a flow shifting cycle time of the fuel cell stack system is determined by the heat-up requirement of the fuel cell stack, wherein the heat-up requirement is determined by the fuel cell stack temperature at start-up, and coolant volume of the fuel cell stack system plus the coolant volume in the auxiliary coolant loop, wherein the coolant volume of the fuel cell stack system plus the coolant volume in the auxiliary coolant loop is determined based on the design parameters of the stack and the auxiliary coolant system.

25. The fuel cell system according to claim 24, wherein a short flow shifting cycle is operable to allow the fuel cell stack system to warm up such that the temperature across the stack is substantially evenly distributed.

26. The fuel cell system according to claim 25, wherein the short flow shifting cycle can be further achieved through coolant volume reduction in a header area of the fuel cell stack system by filling the header area with low pressure drop media, low thermal mass porous media, or a combination thereof, or coolant volume reduction in an active area of the fuel cell stack of the fuel cell stack system active area by using stamped metal plates.

27. The fuel cell system according to claim 22, wherein the auxiliary coolant system valve member is selectively operable to control the temperature differential between the coolant inlet and the coolant outlet of the fuel cell stack system.

28. The fuel cell system according to claim 27, wherein the valve member is a control valve, and further wherein the position of the control valve is feedback controlled by the temperature difference between the fuel cell stack system's coolant inlet and coolant outlet temperatures.

29. The fuel cell system according to claim 22, further comprising a by-pass conduit with a by-pass valve therein that is selectively operable to permit coolant to bypass a radiator during start-up.

* * * * *